(12) United States Patent
Krishnamurthy et al.

(10) Patent No.: US 10,789,546 B2
(45) Date of Patent: *Sep. 29, 2020

(54) COGNITIVE MACHINE LEARNING CLASSIFIER GENERATION

(71) Applicant: International Business Machines Corporation, Armonk, NY (US)

(72) Inventors: Lakshminarayanan Krishnamurthy, Round Rock, TX (US); Niyati Parameswaran, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 682 days.

This patent is subject to a terminal disclaimer.

(21) Appl. No.: 15/190,505

(22) Filed: Jun. 23, 2016

(65) Prior Publication Data

US 2017/0372221 A1    Dec. 28, 2017

(51) Int. Cl.
| | |
|---|---|
| *G06N 20/00* | (2019.01) |
| *G06N 7/00* | (2006.01) |
| *G06F 40/35* | (2020.01) |
| *G06F 40/295* | (2020.01) |

(52) U.S. Cl.
CPC ............ *G06N 20/00* (2019.01); *G06F 40/295* (2020.01); *G06F 40/35* (2020.01); *G06N 7/005* (2013.01)

(58) Field of Classification Search
CPC ........ G06N 99/005; G06N 7/005; G06N 3/08; G06F 17/278; G06F 17/279
See application file for complete search history.

(56) References Cited

U.S. PATENT DOCUMENTS

| | | | |
|---|---|---|---|
| 7,587,374 B1 | 9/2009 | Lynch et al. | |
| 8,332,334 B2 | 12/2012 | Long et al. | |
| 8,694,444 B2 | 4/2014 | Faddoul et al. | |
| 9,830,526 B1* | 11/2017 | Lin | G06K 9/6298 |
| 2010/0011025 A1 | 1/2010 | Zheng et al. | |

(Continued)

FOREIGN PATENT DOCUMENTS

| | | |
|---|---|---|
| CN | 103176961 A | 6/2013 |
| EP | 1522933 A2 | 4/2005 |

OTHER PUBLICATIONS

Yang Wang and Greg Mori, "Max-Margin Latent Dirichlet Allocation for Image Classification and Annotation", Sep. 2011, Proceedings of the British Machine Vision Conference, pp. 1-11. (Year: 2011).*

(Continued)

*Primary Examiner* — Kamran Afshar
*Assistant Examiner* — Ying Yu Chen
(74) *Attorney, Agent, or Firm* — Edward J. Wixted, III

(57) ABSTRACT

A computer-implemented method includes creating a classifier by: training a machine learning model using two or more tasks, wherein the tasks lie in two or more domains; including in the machine learning model at least one attribute common to at least two of said two or more domains; including in the machine learning model at least one latent feature that affects at least two of the two or more tasks that fall within one of the at least two domains; and constructing the classifier based on said machine learning model. The computer-implemented method further includes applying the classifier to at least one operational task.

20 Claims, 12 Drawing Sheets

(56) References Cited

U.S. PATENT DOCUMENTS

| | | | |
|---|---|---|---|
| 2011/0320387 | A1 | 12/2011 | He et al. |
| 2013/0013540 | A1 | 1/2013 | He et al. |
| 2013/0185314 | A1 | 7/2013 | Rubinstein et al. |
| 2014/0280221 | A1* | 9/2014 | Chuang ............... G06F 17/3053 707/748 |
| 2014/0358831 | A1 | 12/2014 | Adams et al. |
| 2015/0052084 | A1 | 2/2015 | Kolluru et al. |
| 2015/0066904 | A1 | 3/2015 | Asur |
| 2015/0186792 | A1 | 7/2015 | Chidlovskii |
| 2016/0124942 | A1* | 5/2016 | Amin ...................... G06F 17/27 704/2 |

OTHER PUBLICATIONS

Yang Bao, Nigel Collier, and Anindya Datta. "A Partially Supervised Cross-Collection Topic Model for Cross-Domain Text Classification", Oct. 2013, CIKM '13: Proceedings of the 22nd ACM international conference on Information & Knowledge Management, pp. 239-248. (Year: 2013).*

Ayan Acharya, Raymond J. Mooney, and Joydeep Ghosh, "Active Multitask Learning Using Both Latent and Supervised Shared Topics", 2014, Proceedings of the 2014 SIAM International Conference on Data Mining, pp. 190-198. (Year: 2014).*

Argyriou et al., "Convex multi-task feature learning", Published online Jan. 9, 2008, Springer Science+Business Media, LLC 2008, DOI 10.1007/s10994-007 5040-8, 30 pages.

Li et al., "Supervised labeled latent Dirichlet allocation for document categorization", Published online: Nov. 25, 2014 © Springer Science+Business Media New Yor 2014, Appl Intell (2015) 42:581-593, DOI 10.110/s10489-014-0595-0, 13 pages.

Krishnamurthy et al., "Cognitive Machine Learning Classifier Generation", U.S. Appl. No. 15/190,487, filed Jun. 23, 2016, 44 pages.

IBM, "List of IBM Patents or Patent Applications Treated as Related", Appendix P, 2 pages, dated Jun. 27, 2016.

Han et al., "Cross-Domain Multitask Learning with Latent Probit Models", Appearing in Proceedings of the 29th International Conference on Machine Learning, Edinburgh, Scotland, UK, 2012, 8 pages, Copyright 2012 by the author(s)/owner(s).

Lacoste-Julien, et al., "DiscLDA: Discriminative Learning for Dimensionality Reduction and Classification", Neural Information Processing Systems Conference (NIPS08), Vancouver, British Columbia, Dec. 2008, 11 pages.

Ramage et al., "Labeled LDA: A supervised topic model for credit attribution in multi-labeled corpora", Proceedings of the 2009 Conference on Empirical Methods in Natural Language Processing, pp. 248-256, Singapore, Aug. 6-7, 2009, © 2009 ACL and AFNLP.

Yoshida et al., "Transfer Learning for Multiple-Domain Sentiment Analysis—Identifying Domain Dependent/Independent Word Polarity", Proceedings of the Twenty-Fifth AAAI Conference on Artificial Intelligence, pp. 1286-1291, Copyright © 2011, Association for the Advancement of Artificial Intelligence (www.aaai.org).

"Latent Dirichlet allocation", Wikipedia, the free encyclopedia, printed on May 3, 2016, 11 pages, <https://en.wikipedia.org/wiki/Latent_Dirichlet_allocation>.

"Statistical classification", Wikipedia, the free encyclopedia, printed on May 20, 2016, 6 pages, <https://en.wikipedia.org/wiki/Statistical_classification>.

Acharya et al., "Active Multitask Learning Using Both Latent and Supervised Shared Topics", Proceedings of the 2014 SIAM International Conference on Data Mining, Apr. 24-26, 2014, Philadelphia, Pennsylvania, pp. 190-198.

* cited by examiner

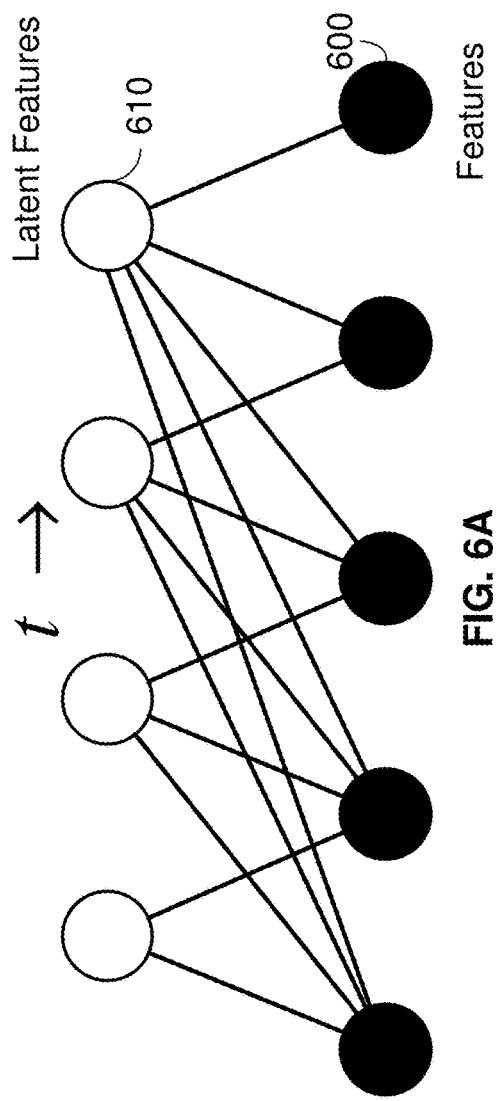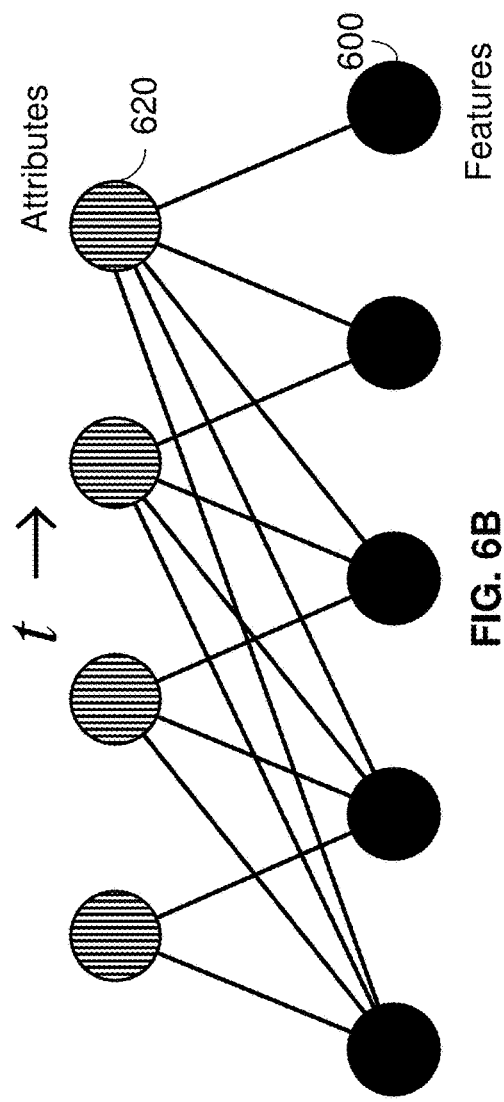

COGNITIVE MACHINE LEARNING CLASSIFIER GENERATION

BACKGROUND

The present invention relates generally to the field of machine learning, and more particularly to generating classifiers from cognitive machine learning models.

"In the field of machine learning, Latent Dirichlet Allocation (LDA) is a generative statistical model that allows sets of observations to be explained by unobserved groups that explain why some parts of the data are similar." *Latent Dirichlet Allocation*, WIKIPEDIA, THE FREE ENCYCLOPEDIA, https://en.wikipedia.org/wiki/Latent_Dirichlet_allocation (last accessed May 3, 2016). "Labeled LDA [is] a topic model that constrains [LDA] by defining a one-to-one correspondence between LDA's latent topics and user tags." Daniel Ramage et al., *Labeled LDA: A supervised topic model for credit attribution in multi-labeled corpora*, 1 EMNLP '09 248, 248 (2009), available at http://dl.acm.org/ft_gateway.cfm?id=1699543&type=pdf&CFID=610241880&CFTOKEN=34401448. By contrast, discriminative LDA provides "a supervised dimensionality reduction algorithm that uncovers the latent structure in a document collection while preserving predictive power for the task of classification." S. Lacoste-Julien et al., *DiscLDA: Discriminative Learning for Dimensionality Reduction and Classification*, 21 NIPS08 (2008), available at http://papers.nips.cc/paper/3599-disclda-discriminative-learning-for-dimensionality-reduction-and-classification.pdf. Engineers and computer scientists continue to face challenges in the field of LDA variants.

SUMMARY

A computer-implemented method includes creating a classifier by: training a machine learning model using two or more tasks, wherein the two or more tasks lie in two or more domains; including in the machine learning model at least one attribute common to at least two of said two or more domains; including in the machine learning model at least one latent feature that affects at least two of the two or more tasks that fall within one of the at least two domains; and constructing the classifier based on said machine learning model. The computer-implemented method further includes applying the classifier to at least one operational task.

BRIEF DESCRIPTION OF THE DRAWINGS

FIG. 6A is a network diagram of a learning model associated with LDA techniques, in accordance with at least the modeled embodiment described herein.

FIG. 6B is a network diagram of a learning model associated with labeled LDA techniques, in accordance with at least the modeled embodiment described herein.

DETAILED DESCRIPTION

Figure 1:
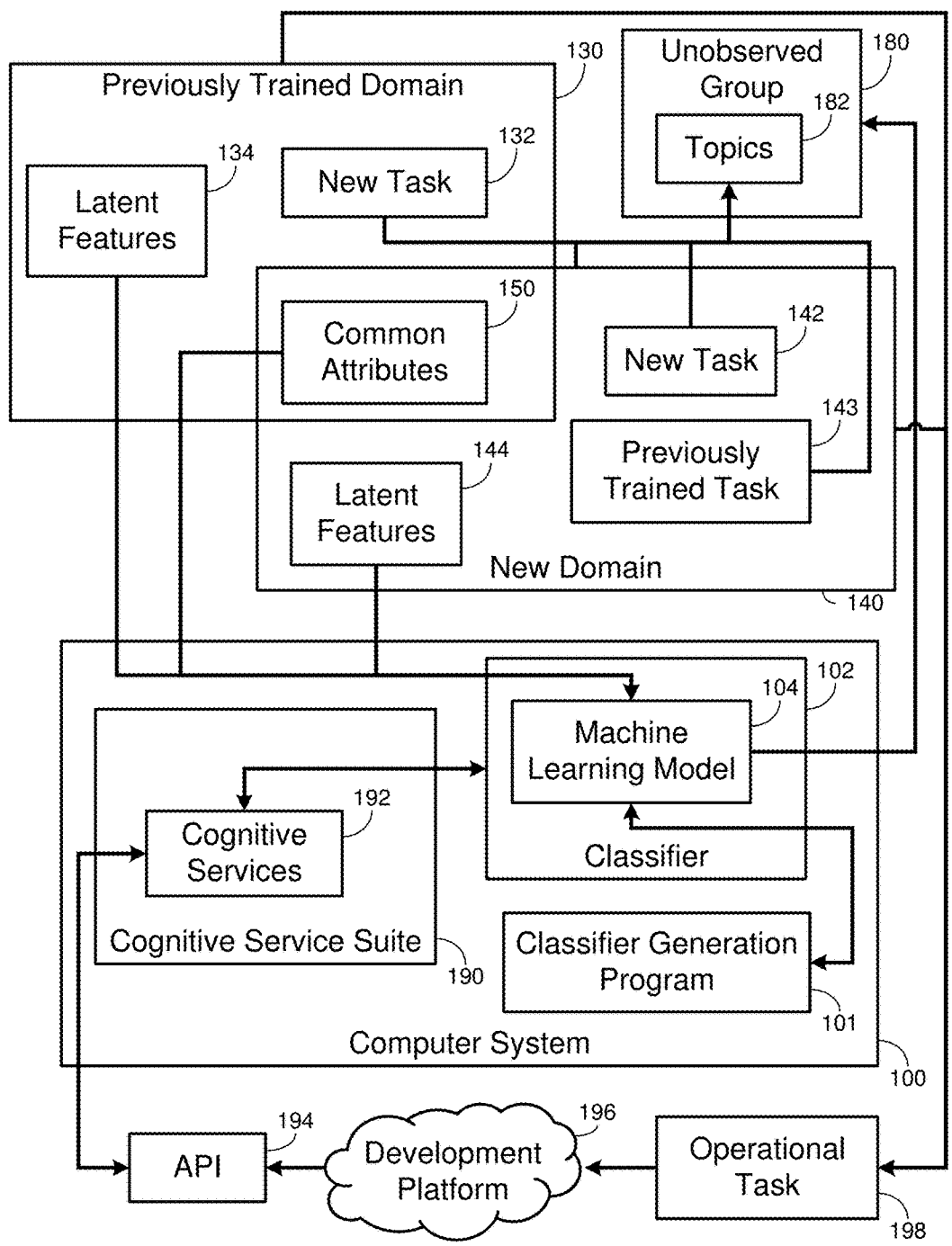
FIG. 1 is a functional block diagram illustrating a various elements of a computing environment suitable for operating a classifier generation program, in accordance with at least one embodiment of the present invention.

FIG. 1 is a block diagram of various components of an operational environment for a classifier generation program 101, in accordance with at least one embodiment of the invention. A computer system 100 may include any type of computing platform, including a single sever or workstation computer, a distributed or virtual computer, or a portable or embedded device. In the depicted embodiment, the classifier generation program 101 produces and/or interacts with a classifier 102, which in turn operates based on a machine learning model 104.

The classifier 102 may be provided to one or more cognitive services 192, which in turn may be aggregated into a cognitive services suite 190. IBM® Watson® is one non-limiting example of a cognitive services suite wherein various cognitive services are made available via a set of APIs. In the depicted embodiment, the cognitive services 192 are made available to user-level applications via an application programming interface (API) 194. The API 194 may be accessed via a development platform 196. In the depicted embodiment, the development platform 196 may be a cloud-based development environment such as IBM® Bluemix®. Ultimately, an operational task 198 poses a real-world problem to the classifier 102. In the depicted embodiment, the operational task 198 arises from a user-level application that accesses one of the cognitive services 192. In alternative embodiments, the operational task may include a user-level application that includes the classifier 102 in its own executable, module, or other program package. In other alternative embodiments, the operational task may access the classifier 102 via a client/server or other network model, without the intermediary of a cognitive services suite, such as the cognitive services suite 190.

Referring still to the embodiment depicted in FIG. 1, the machine learning model 104 upon which the classifier 102 is based interacts in both training and in new/operational exposure with various tasks and domains. Examples of tasks include sentiment analysis (i.e., expressions of positive or negative feelings when communicating on a topic) and facial expression analysis (i.e., inferred emotional state by facial expressions in conjunction with communicating on a topic). Where these are applied to a video of a person speaking and expressing an opinion, such as whether the person likes or dislikes a food item or a famous person, then the tasks may be understood as in one domain or the other. That is, if the video content is about a famous person or organization, notable persons may be understood to be the domain, and, if both sentiment analysis and facial expression analysis are applied, then both of those tasks may be understood as being in the domain of politics. Similarly, where both sentiment analysis and facial recognition are applied to food preferences, then those same tasks may be understood as in the domain of food.

Thus, in the embodiment depicted in FIG. 1, the machine learning model may perform tasks and/or operate on attributes in both any previously trained domain 130 and any new domain 140. Shared between the previously trained domain 130 and the new domain 140 are various common attributes 150. Similarly, the previously trained domain 130 may have one or more latent features 134, which distinguish the previously trained domain 130 from the new domain 140, which has its own latent features 144 that make a parallel distinction. Thus, by discovering which attributes of the previously trained domain 130 are common attributes 150 and which are latent features 134, the classifier generation program 101 can determine which features are relevant to the classifier 102 for the new domain 140, and domain adaptation is achieved.

Correspondingly, any previously trained domain 130 may include a new task 132, and any new domain 140 may include a new task 142. The new task 132 may be performed by the machine learning model 104 using all of the features of the previously trained domain 130 to achieve transfer learning. For the new task 142, which is in the new domain 140, the classifier generation program 101 can generate the machine learning model 104 from the common attributes 150 and latent features 144, which define the new domain 140. Thus, for the new task 142, the classifier generation program can achieve both transfer learning (new task) and domain adaptation (new domain) in the same transition. The new task 142 and/or the new domain 140 and/or the new task 132, when performed using the machine learning model 104, provide the power to discover at least one unobserved group 180, which includes at least one previously unknown topic 182.

Contrasting the computing environment model of FIG. 1 to human intelligence, the inventors have observed that humans have the ability to inherently transfer knowledge between tasks. Thus, the inventors have reasoned, human learners not only recognize but also apply relevant knowledge successfully to new tasks that require reflection and thoughtful application of knowledge gained from previous learning experiences. By contrast, the inventors have observed and/or recognized that existing machine learning algorithmic paradigms focus on addressing learning tasks in isolation where learning in one task is independent of the other. Consequentially, the inventors have reasoned, classifier applications that are challenged by scarcity of labeled data become demanding problems for data scientists because the predictive capabilities of machine learning algorithms are hindered in such cases. Moreover, the inventors have further reasoned, given that the distribution of data changes over time, rendering models trained with older data makes machine learning frameworks trained on older data much less capable of discovering useful structures from newly available data.

The inventors have further observed and/or recognized that transfer learning thus emerges as a convenient concept to change the aforementioned notion of isolated learning by developing methods to transfer knowledge gained in one or more source tasks and exploit the learned knowledge a related target task with improved learning. However, the inventors have further observed and/or recognized, transfer learning as a known framework works at identifying and overcoming target tasks by either simultaneously training models across domains or by focusing on a sequential transfer of knowledge from one domain to another. The inventors have further observed and/or recognized that this is a current significant limitation of transfer learning that restricts the application of transfer learning when the focus is on domain adaptation tasks that require the source and target tasks to be learned simultaneously through multi-task learning.

And so, the inventors have reasoned, while transfer learning is a suitable framework to overcome problems of isolated learning by learning a model specific to a domain and then to benefit from learning other models in other domains. This, the inventors have further observed and/or recognized, merely starts to scratch the surface for domain adaptation tasks that require multi-task learning because there is no real attempt to allow for both simultaneous and sequential knowledge transfer in an aggregated manner.

The inventors have further observed and/or recognized that one possible point of novelty in the proposed system of the present invention rests in the framework's unique ability not only to share knowledge across multiple tasks within related domains (for simultaneous learning), but also to adapt learned distributions to fit data from new domains (for sequential learning). Thus, embodiments of the present invention conceptualize a latent variable model and introduce two new frameworks: a modified supervised LDA model and its non-parametric variation. Embodiments of the present invention are thus capable, the inventors have further observed and/or recognized, of integrating two different types of supervision: topic labels and category labels, which renders embodiments of the present invention applicable to multi-task learning endeavors whose primary goal is domain adaptation. Since both the latent and supervised topics are shared across multiple categories, embodiments of the present invention incorporate the aforementioned unique characteristics of the data.

Thus, the inventors categorize existing methodologies for knowledge acquisition into two fields. The first field, inspired from human perception and learning, observes that humans are capable of recognition and inference through intrinsic correlation across various domains because humans exhibit simultaneous knowledge learning. In the first field, human abilities are mimicked by mining features from data for which the distribution and feature space changes over time. The second field, derived from training tasks in isolation where each task is learned independently by a different classifier, is restricted to data whose feature space and distribution is constant over time. The inventors suggest that some embodiments of the present invention combine both these fields and/or approaches to knowledge acquisition for building a multi-task learning framework for domain adaptation.

Thus, in embodiments of the present invention, not only is the classifier first trained to predict attributes from raw features and then trained to predict categories from the attributes, but also the classifier is capable of working efficiently with labeled data that is presented via class labels. The inventors have further observed and/or recognized that the aforementioned combined properties permit the classifier to simultaneously acquire knowledge and also string the knowledge coherently into a sequence, which provides advancement in the art of machine learning. Further, the inventors have observed and/or recognized that embodiments of the present invention advance the art by using probabilistic latent variable models as the building blocks for aggregated knowledge acquisition. Further, the inventors have observed and/or recognized that the combined framework includes a capacity to work successfully with supervision that is naturally available from different sources at different levels of abstraction. For example, supervision may be provided as keywords, topics, and categories for documents in conjunction with visual attributes, objects, and scene labels for images, and various embodiments would exhibit learn and transfer knowledge across both documents and images, which may not only result in improved internal representation of the document and/or image data, but also acquire, for the framework/model, an enhanced understanding of different tasks in different domains. In such embodiments, higher/improved classification accuracy may be achieved because the classifier can infer object attributes by only witnessing raw object features on testing. Thus, the inventors conclude that embodiments of the present invention uniquely exploit transfer learning for tasks that require multi-task learning across domains.

The inventors have further observed and/or recognized that embodiments of the present invention may have application at least in text analysis, object recognition from images, and recommender systems. Further, the inventors have observed and/or recognized that embodiments of the present invention have the ability to heavily discount the computational effort and/or load that is needed to recollect training data and rebuild models in cognitive services suites especially as such systems capabilities are harnessed across varied tasks in varied domains. Further, the inventors have observed and/or recognized that embodiments of the invention provide a framework that is capable of working from high-level object descriptions, for example where a classifier if applied to an object recognition problem, that classifier would be able to correlate a tripod as a stand with 3 legs. Further, the inventors have observed and/or recognized that a classifier according to various embodiments may be capable of being trained to examine the representations learned from previous tasks and use the knowledge that has been gained independently in other tasks to make classifications across domains. It will be understood, however, that the aforementioned statements, observations and/or recognitions of possible advantages of the present invention and/or problems with the prior art need not necessarily be present and/or resolved in any particular embodiment of the present invention and are not to be understood as necessary for the practice of the present invention.

Figure 2:
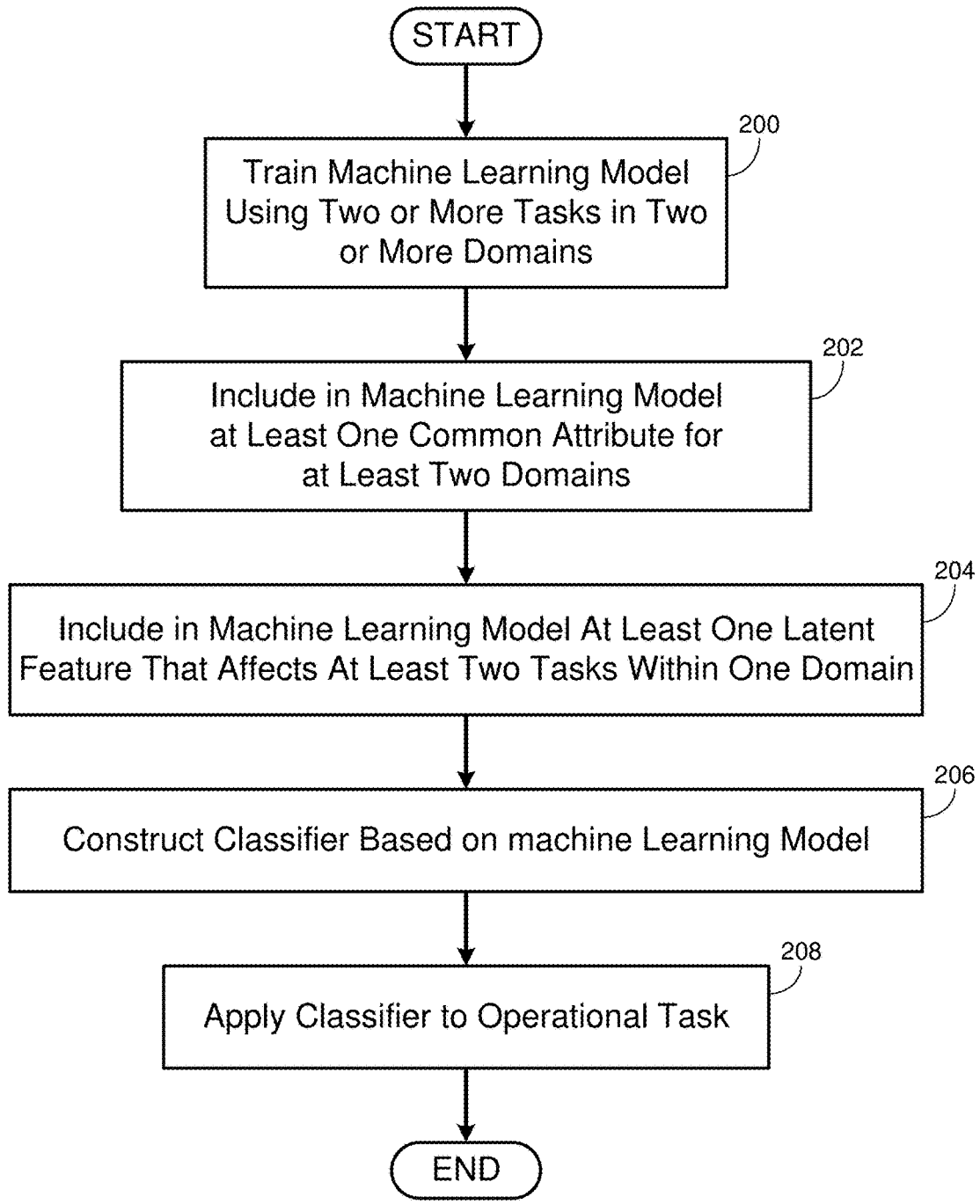
FIG. 2 is a flowchart diagram depicting various operational steps for a classifier generation program, in accordance with at least one embodiment of the present invention.

Referring now to FIG. 2, FIG. 2 is a flowchart diagram for a classifier generation program 101, in accordance with at least one embodiment of the present invention. In some embodiments, the classifier generation program may be understood as a method for a multi-task learning framework to facilitate knowledge acquisition and transfer learning across domains. In the depicted embodiment, at step 200, the classifier generation program trains a machine learning model, such as the machine learning model 104, using two or more tasks. The two or more tasks lie in two or more domains. The classifier generation program 101, at step 202, includes in the machine learning model, such as the machine learning model 104, at least one attribute common to at least two of the two or more domains. At step 204, the classifier generation program 101 includes in the machine learning model, such as the machine learning model 104, at least one latent feature that affects at least two of the two or more tasks that fall within on the at least two domains.

Referring still to the embodiment depicted in FIG. 2, LDA is the basic building block for performing the transfer learning and domain adaptation that underlies steps 200-204. LDA uses a generative model that allows sets of observations to be explained by unobserved groups in a manner that validates why some parts of a given input data are similar. Conventional LDA focuses on unsupervised induction of multiple "topics" and thus provides characterization for a corpus of text documents. FIG. 6A illustrates conventional LDA in terms of features 600, which include all features of a given domain, latent features 610, which are those features that serve to distinguish a given topic from other topics in the same space, corpus, or system. In FIG. 6A, time, designated t, is shown to move from left to right, wherein features 600 begin as all latent, and then as the model is refined over time and similarities and differences between topics are learned, fewer features are identified as latent in the machine learning model, such as the machine learning model 104. In performing the training of steps 200-204, the LDA approach is augmented to include two different types of supervision.

Labeled LDA (Supervision type 1) includes the assessment of document level labels for a topic. That is, supervision is provided by labeling each document with its list of topics. For example, when rendering a webpage that includes tags, labeled LDA can be applied to the web page content to highlight interesting portions of the content, based on the tags. Further, labeled LDA can also be applied to build a summary of text from multiple webpages that share the same set of tags. Thus, this supervision accounts for sequential learning akin to human perception. In terms of the embodiment depicted in FIG. 2, the classifier generation program 101 including in the machine learning model, at step 202, at least one attribute common to at least two of said two or more domains can include applying supervised machine learning, and the supervised machine learning can included labeled LDA.

FIG. 6B distinguishes labeled LDA from conventional LDA, as shown in FIG. 6A. In the diagram of FIG. 6B, time, t, progresses from left to right, and attributes 620, as opposed to latent features 610, are discovered. Attributes 620, by contrast to latent features 610, show similarities and/or shared characteristics between topics and/or labels. Thus, if a group of features 600 are taken as to be within the same domain, then by extraction of attributes 620 from those features, the attributes 620 may be understood to be attributes of the domain.

Figure 7A:
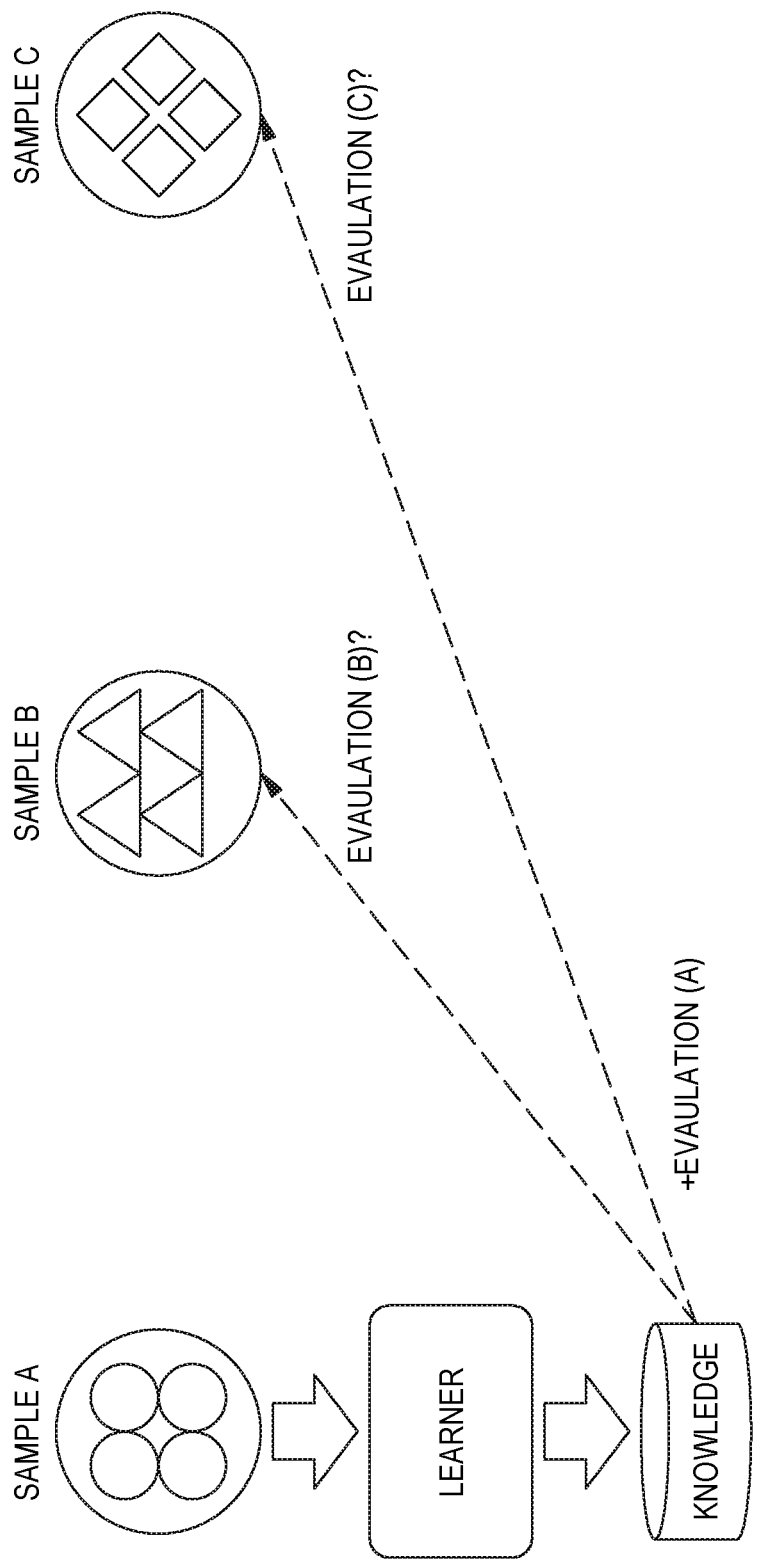
FIG. 7A is a network diagram depicting a high level algorithmic overview for domain adaptation, in accordance with at least one embodiment of the present invention.

FIG. 7A places labeled LDA in context. The diagram of FIG. 7A depicts a high level algorithmic overview for domain adaptation using labeled LDA. The depicted diagram provides for sequential knowledge transfer akin to human perception wherein the same task is performed with multiple domains being factored in. In FIG. 7A, each set of shapes may be understood as a domain, with some task to be applied to those shapes that is the same in each domain. As shown, the learner (i.e., a machine learning model such as the machine learning model 104), is trained on a sample of circles. Sequentially, the learner is exposed to the triangles, and then, when the learner is applied to the rhombuses, the learner can apply its gained knowledge from the circles and triangles to perform the same task for rhombuses.

Referring still to the embodiment depicted in FIG. 2, discriminative LDA (Supervision type 2) includes creating, by the classifier generation program 101, one or more overall category inferences from various topics. Discriminative LDA may be understood to provide supervision through a single response variable, for which the task is to predict the value of the response variable for a given document. In various embodiments employing discriminative LDA, the response can be a real value or a categorical value or identifier. In various embodiments employing discriminative LDA, the response can be modeled by a normal, Poisson, binomial, or any similar distribution. For example, where the objective is to infer a low dimensional, topic based representation of one or more documents, embodiments of the classifier generation program 101 employing discriminative LDA can both perform dimensionality reduction and provide improved classification in the dimensionally reduced space through more trivial update equations.

Thus, discriminative LDA can account for simultaneous learning, akin to conventional machine learning algorithms wherein multiple tasks in the same domain can factor into the machine learning model. By contrast to labeled LDA, which only uses supervised topics and does not have any mechanism for generating the class labels (labeled LDA may be understood to correspond to and/or approximate the function of attributes in a computer vision task), discriminative LDA only has latent topics and/or feature (as in step 204) but learns a discriminative model for predicting classes from these topics (discriminative LDA may be understood to correspond to and/or approximate in function the hidden layer in conventional multi-task learning, where there is no supervision in the form of topic tags or categories assigned to a document, thus discriminative LDA may be understood equivalently as both supervised through the response variable and unsupervised because it lacks given topics).

Figure 6C:
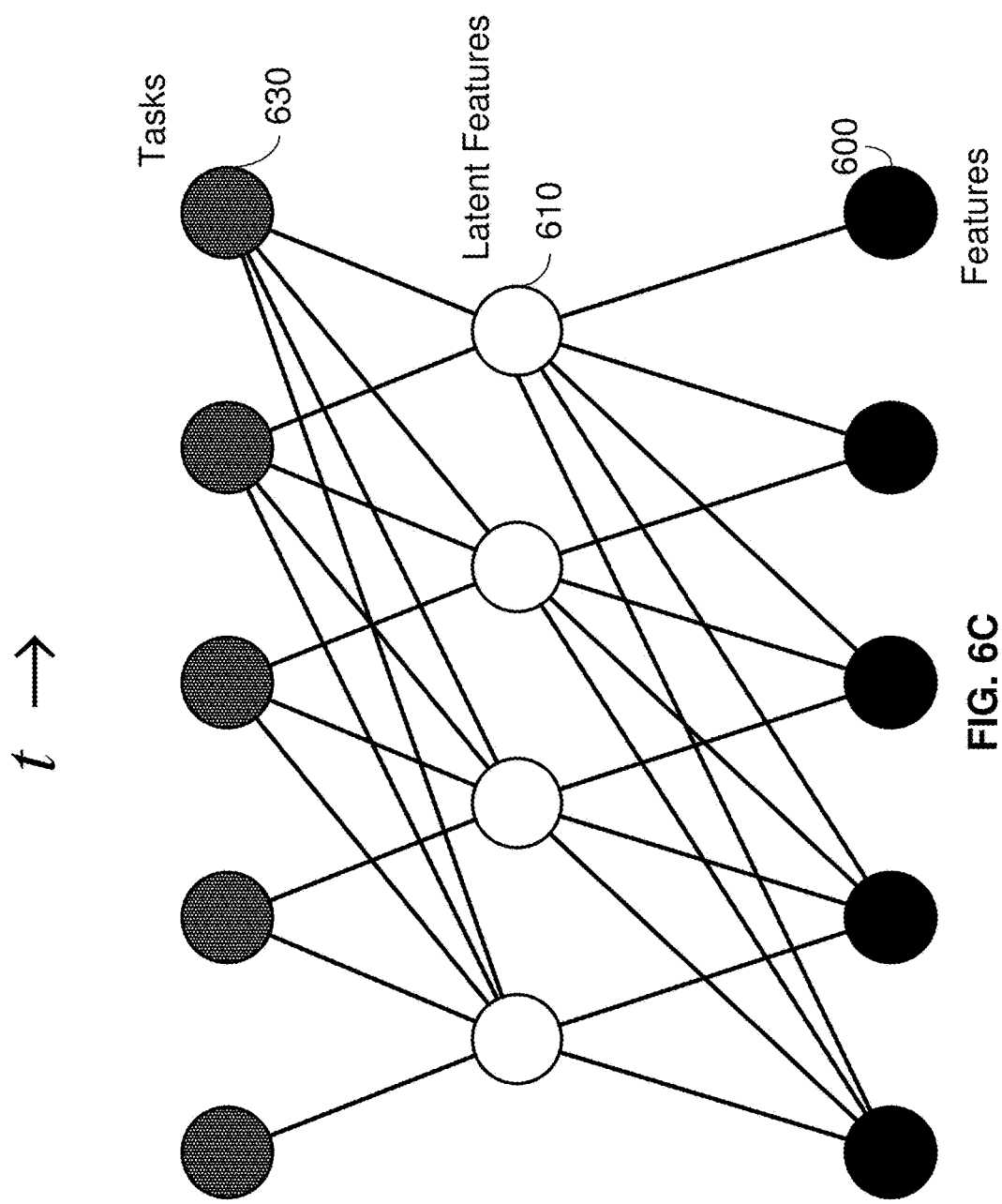
FIG. 6C is a network diagram of a learning model associated with discriminative LDA, in accordance with at least the modeled embodiment described herein.

Further, FIG. 6C depicts a diagram for a machine learning model employing discriminative LDA. As shown, the features 600 identify, through the machine learning model, latent features 610 that discriminate between topics. The latent features 610 in turn provide classification for various tasks 630, which are discriminated between through the response variable. With reference to the diagram of FIG. 6C, embodiments of the classifier generation program 101 that invoke discriminative LDA may be understood to create an overall category inference that predicts classes based on the document topics (or the image attributes, or the like) in a manner that transfers across tasks and does not involve supervision in the sense that labeled LDA is supervised.

Figure 7B:
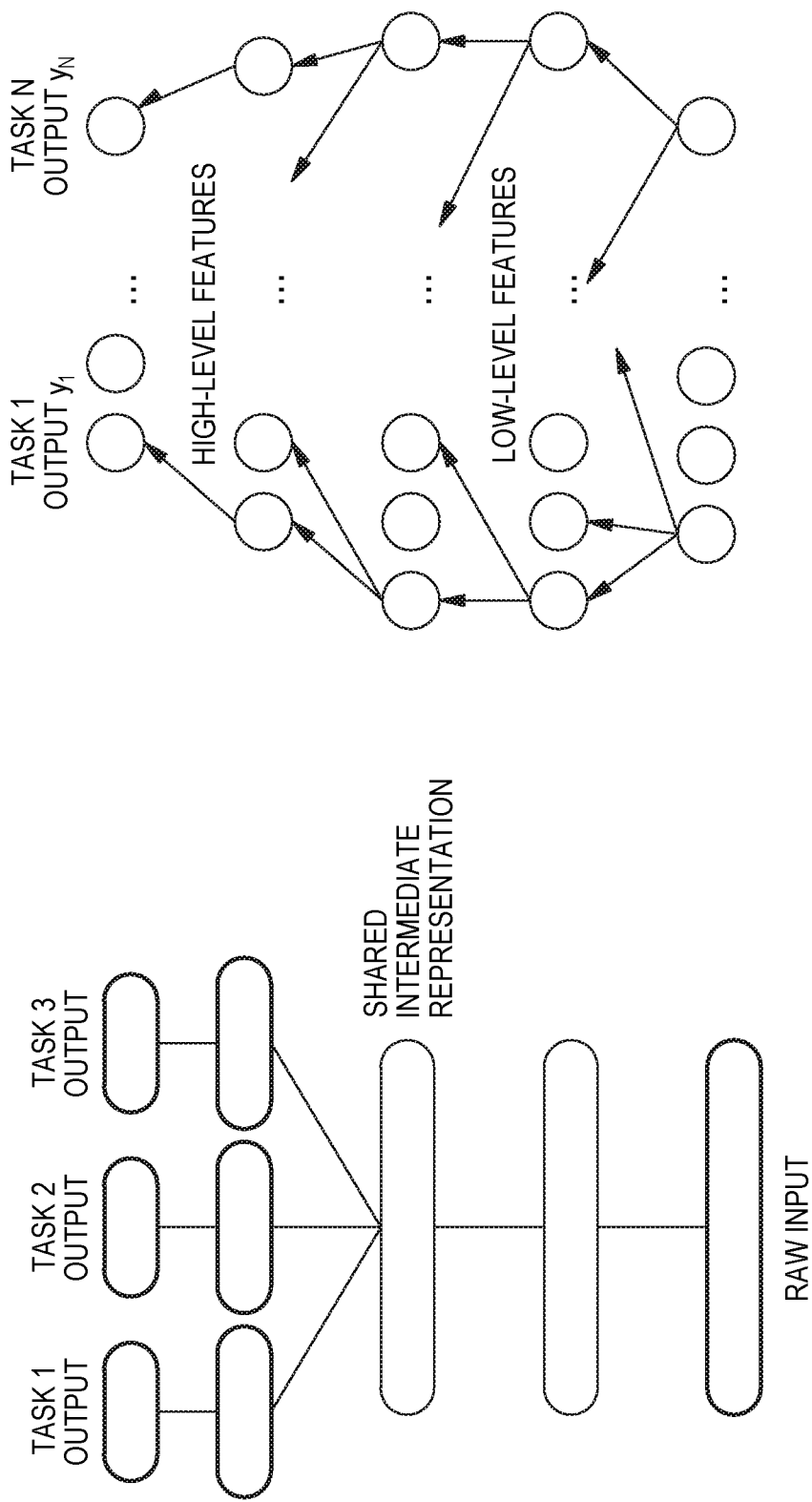
FIG. 7B is a network diagram depicting a high level algorithmic overview for multi-task learning, in accordance with at least one embodiment of the present invention.

FIG. 7B provides a high level algorithmic overview of discriminative LDA, wherein, as per the left half of the diagram, raw input trains a shared intermediate input, from which specific classifiers (smaller shaded ovals) are trained to provide output for various tasks. On the right half of the diagram, various output classifications are shown to progress from distinguishing lower level features to higher level features, with the higher level features being progressively more abstract and finely tuned to more subtle patterns.

In terms of the embodiment depicted in FIG. 2, the classifier generation program 101, at step 204, may be understood to include in the machine learning model at least one latent feature that affects at least two of the two or more tasks that fall within one of the at least two domains by applying unsupervised machine learning, which includes discriminative LDA.

Figure 6D:
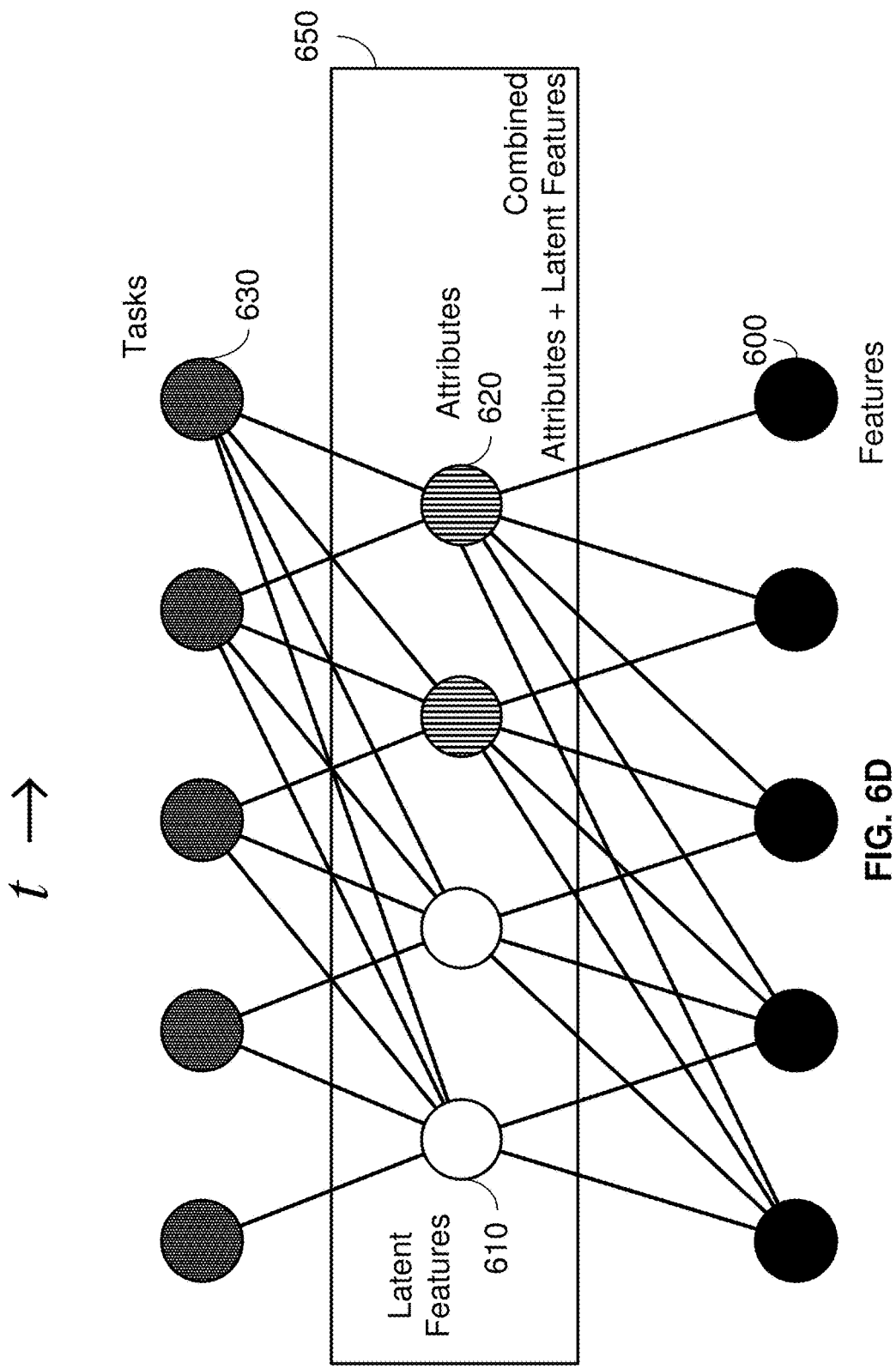
FIG. 6D is a network diagram of a learning model incorporating both labeled LDA and discriminative LDA techniques, in accordance with at least the modeled embodiment described herein.
Figure 8:
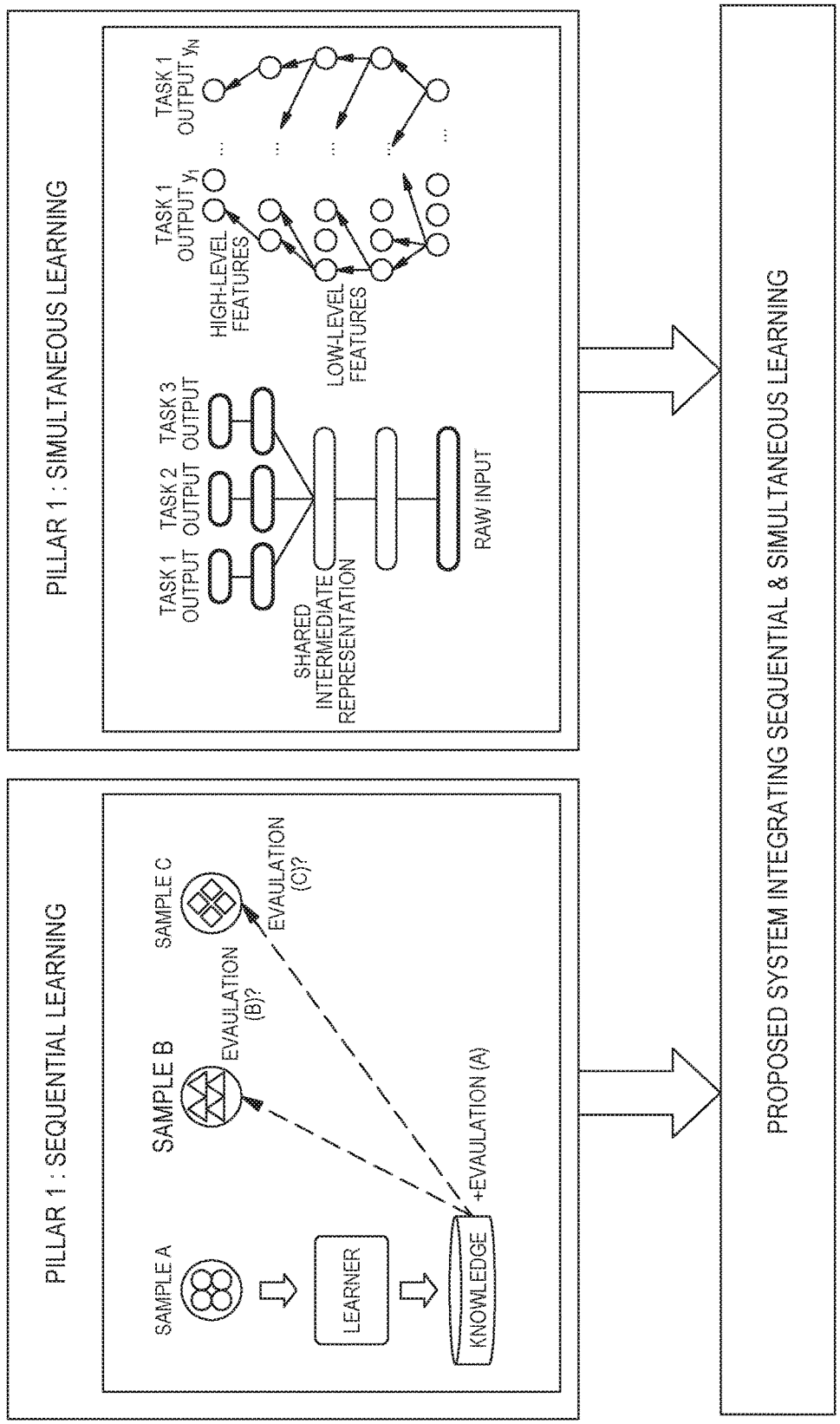
FIG. 8 is a network diagram depicting a high level algorithmic overview for a classifier generation program incorporating both labeled LDA and discriminative LDA, in accordance with at least one embodiment of the present invention.

FIG. 8 provides a high level algorithmic view of how both labeled and discriminative LDA can apply in a single machine learning framework, and how a classifier based on the combined model is operable to apply derived information both concurrently (discriminative LDA) and sequentially (labeled LDA). Embodiments of the invention conceptualize the above-discussed concepts as a new modified supervised LDA framework and its non-parametric variation. Thus, if a classifier according to various embodiments of the invention is working with a training corpus including N documents which belong to Y different classes, where each document belongs to exactly one class and each class corresponds to a different task, such a classifier may train a machine learning model using words in the data as well as associated supervised topic tags and class labels, which may be provided through either text or images, and then use the machine learning model to classify test data that is completely unlabeled with no topic tags nor class labels. FIG. 6D provides a diagrammatic explanation of a combined LDA framework, in accordance with an embodiments wherein a combined layer 650 of latent features 610 and attributes 620 makes up the intermediate knowledge of a machine learning model from which various classifiers can be generated for various tasks 630.

Thus, referring still to the embodiment of FIG. 2, at step 206, the classifier generation program 101 constructs, creates, or instantiates a classifier, such as the classifier 102, based on the machine learning model, such as the machine learning model 104. As generally understood in the field of machine learning, the term "classifier", including the classifier 102, means a concrete implementation of an algorithm that implements classification. LDA, including labeled LDA, discriminative LDA, and combined LDA according to various embodiments of the present invention, may be understood to be examples of classification algorithms. Thus, "classifier" as used herein means any software function, method, object, module, engine, etc. that performs classification according to a model, such as the machine learning models herein described. A machine learning model itself, such as the machine learning model 104, may be understood as any electronic representation that maps input data to machine learning decisions, including LDA functions as described herein, neural nets, etc. For a machine learning model to be understood to include some data, such as having been trained on a given corpus, it will be understood that such inclusion means that the corpus has affected the machine learning module in some way such that the operation of the machine learning model necessarily is taking the corpus into account without necessarily providing a human-predictable result because of such inclusion.

Referring still to the embodiment of FIG. 2, at step 208, the classifier generation program 101 applies the classifier, such as the classifier 102, to at least one operational task. The operational task may be understood as a real-world classification task with real data, as opposed to training data with known results. With reference to FIG. 1, the operational task can be at least one of: (a) a new task in a previously trained domain (transfer learning); (b) a previously trained task in a new domain (e.g., previously trained task 143) (domain adaptation); and (c) a new task in a new domain (simultaneous transfer learning and domain adaptation). In various embodiments, the classifier, such as the classifier 102, can be understood to provide a latent generative model that includes sets of observations of one or more topics explained by one or more unobserved groups in at least one of (a) one or more of the two or more tasks; and (b) one or more of the two or more domains; and wherein the latent generative model is applied to the operational task.

Figure 3:
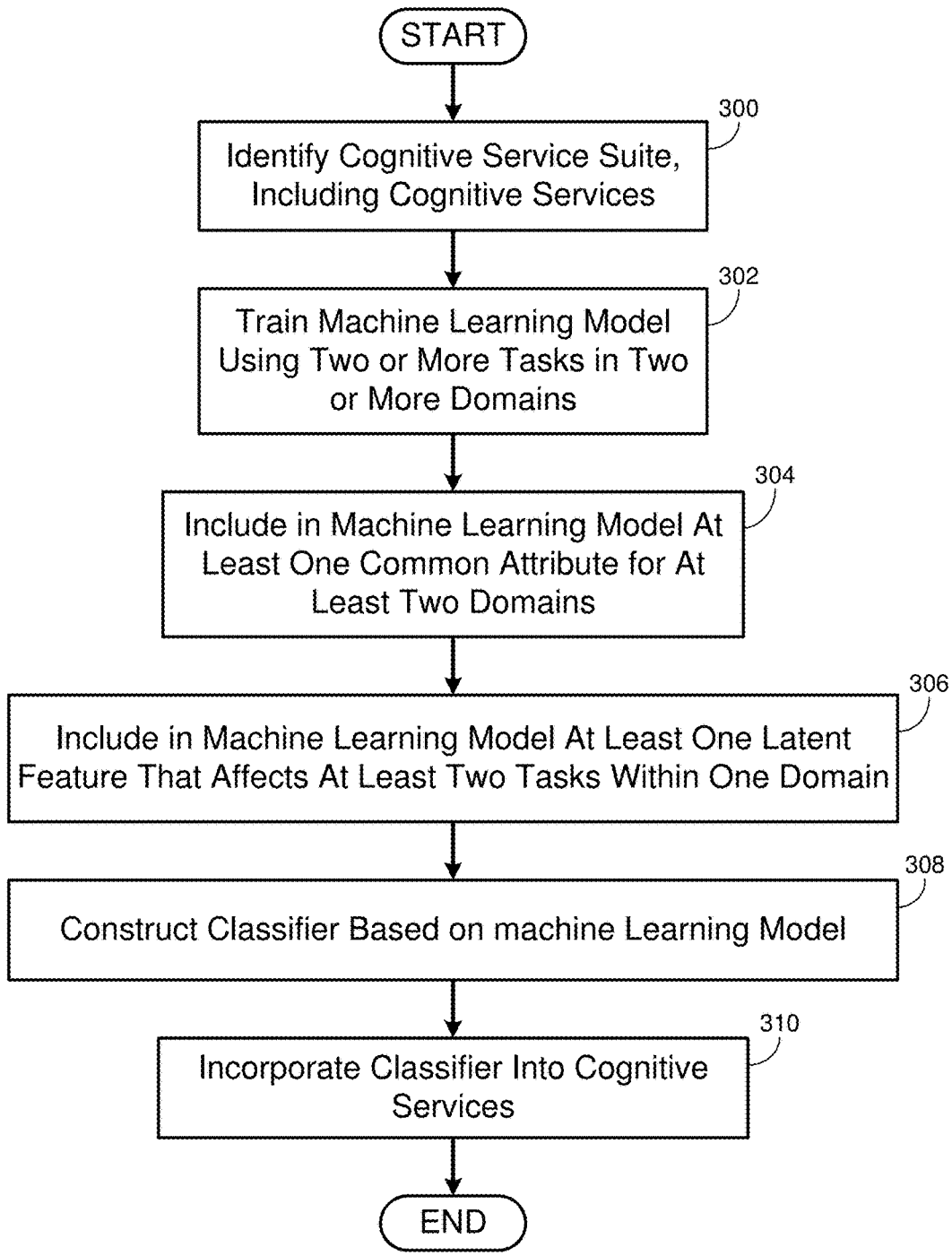
FIG. 3 is a flowchart diagram depicting various operational steps for a classifier generation program in the context of a cognitive services suite, in accordance with at least one embodiment of the invention.

Referring now to FIG. 3, FIG. 3 is a flowchart diagram for a classifier generation program 101, according to at least one embodiment of the invention. In the embodiment depicted in FIG. 3, at step 300, the classifier generation program 101 identifies a cognitive services suite, such as the cognitive services suite 190. The cognitive services suite 190 includes one or more cognitive services 192. Examples of cognitive services include: (a) natural language classification; (b) sentiment analysis; (c) retrieval and ranking; (d) concept insight generation; (e) natural language processing; (f) natural language translation; (g) tone analysis; (h) personality insight generation; (i) conversational dialog; (j) entity and relationship extraction; (k) customer engagement analysis; and (l) relationship discovery (e.g., in the life sciences, drug discovery, and oncological diagnosis applications). Examples of underlying operational tasks of various cognitive services 192 can include sentiment analysis, retrieve and rank, discovery, decision, policy, etc.

Referring still to the embodiment of FIG. 3, at step 302, analogously to step 202, the classifier generation program 101 creates a classifier by training a machine learning model, such as the machine learning model 104, using two or more tasks, wherein the two or more tasks lie in two or more domains. At step 304, analogously to step 204, the classifier generation program 101 includes in the machine learning model, such as the machine learning model 104, at least one attribute common to at least two of the two or more domains. At step 306, analogously to set 206, the classifier generation program 101 includes in the machine learning model, such as the machine learning model 102, at least one latent feature that affects at least two of the two or more tasks that fall within one of the at least two domains.

Referring still to the embodiment depicted in FIG. 3, at step 308, the classifier generation program 101 constructs the classifier, such as the classifier 102, based on the machine learning model, such as the machine learning model 104, and incorporates the classifier into at least of the plurality of cognitive services, such as the cognitive services 192. At step 310, the classifier generation program incorporates the classifier, such as the classifier 102, into at least two of the plurality of cognitive services 192. Thus, for the cognitive services suite 190, the benefits of combined transfer learning and domain adaptation as well as combined sequential and simultaneous learning are incorporated into the cognitive service suite 190 at a fundamental level such that at least two of the cognitive services 192 (analogous to operational tasks) benefit from the enhanced learning.

Figure 4C:
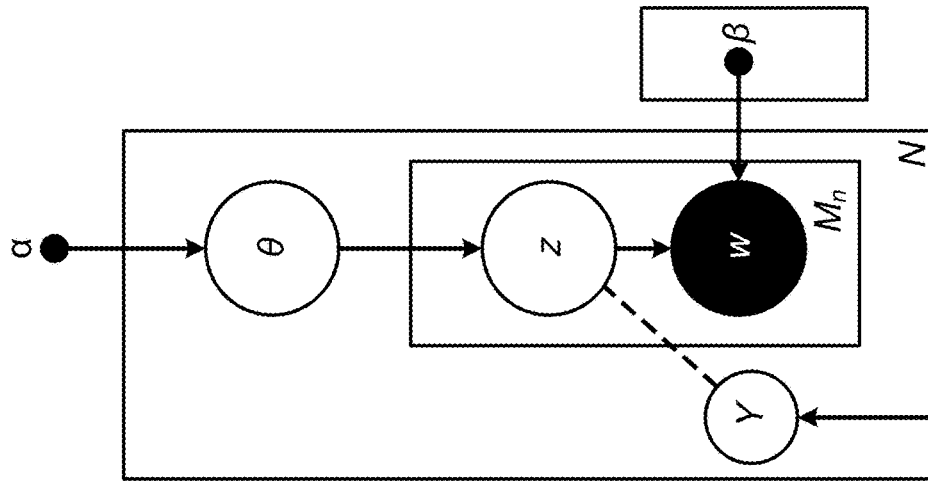
FIG. 4C is a logical diagram of a learning model associated with discriminative LDA, in accordance with at least the modeled embodiment described herein.

Thus, in some embodiments at least two of the plurality of cognitive services include distinct operational tasks within a single domain, for example where the two services are applied to similar topic areas, for example applying both sentiment analysis (an operational task) and facial expression analysis (another operational task) to videos of people describing how they feel about food (a domain). Similarly, in some embodiments, at least two of the plurality of cognitive services comprise a common operational task within distinct operational domains (as per FIG. 4A). In a similar example, one cognitive service may apply sentiment analysis (a task) to opinions about food (a domain), and another cognitive service may apply sentiment analysis (the same task) to opinions about politicians (another domain, for example in FIG. 4C). In other embodiments, at least two of the plurality of cognitive services comprise distinct operational tasks in distinct operational domains.

Further, the cognitive services suite 190 may be accessible through at least one API 194, and the API may be integrated with and/or accessible via a cloud-based application development platform, such as the development platform 196. The development platform 196 can include any system that provides any degree of infrastructure for cloud-based applications together with, in the same computing environment, an API for a cognitive service 192. Examples of cloud-based infrastructure include software-as-a-service, infrastructure-as-a-service, and framework-as-a-service models.

A theoretical validation of the proposed system has been presented below, with reference to FIGS. 4A, 4B, 4C, and 5. The proof recites the generative model of modified supervised LDA according to various embodiments of the invention as well as provides backing on how the inference and learning occurs across different tasks and different domains.

Referring now to a generative model, the inventors propose a mathematically described model that demonstrates one embodiment of the invention. The modeled embodiment, depicted symbolically in FIGS. 4A, 4B, 4C, and 5, addresses a task of topic selection over a plurality of documents. It will be understood that the recitation of the model for the modeled embodiment is not to be construed as limiting on or required for all embodiments that practice the invention.

Figure 4B:
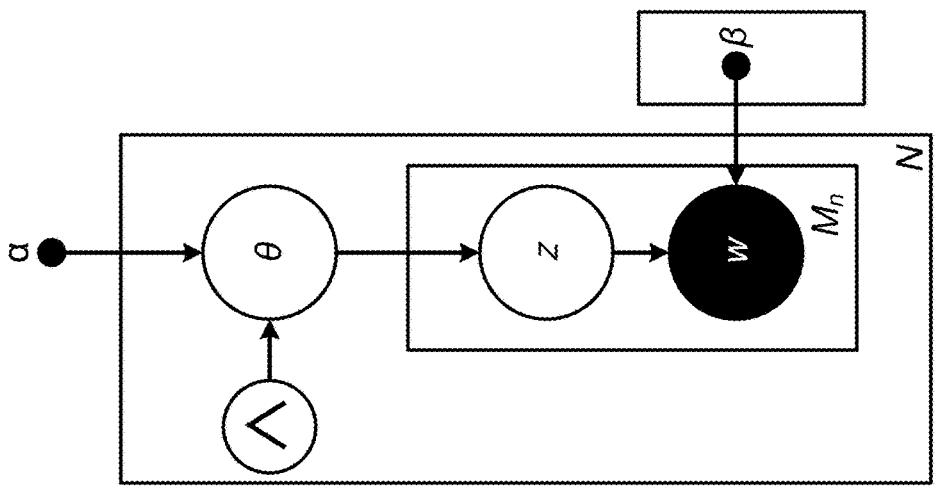
FIG. 4B is a logical diagram of a learning model associated with labeled LDA techniques, in accordance with at least the modeled embodiment described herein.
Figure 4A:
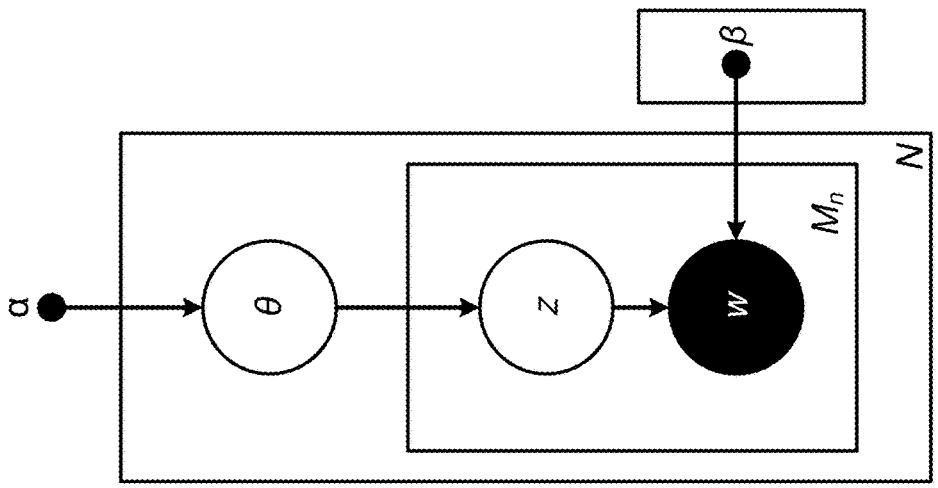
FIG. 4A is a logical diagram of a learning model associated with LDA techniques, in accordance with at least the modeled embodiment described herein.

With respect to the modeled embodiment, for the $n^{th}$ document, let the topic selection probability, as per FIG. 4B, vector be defined as follows: $D_n \sim \text{Dir}(\alpha_n)$ where $\alpha_n = \Lambda_n \cdot \alpha$; and $\alpha$ is a parameter of Dirichlet distribution of dimension K; and K is the total number of topics. Of the topics, latent topics $\Rightarrow K_1$, and supervised topics $\Rightarrow K_2$. $\Lambda_n$ is a diagonal binary matrix of dimension K×K.

Referring still to the modeled embodiment, considering a feature vector wherein the Kth diagonal entry will be 1, in the cases shown:

$$\text{The } K^{th} \text{ diagonal entry} = \begin{cases} 1 & 1 \le K \le K_1 \\ \text{or} & K_1 \le K \le K \\ \text{and } n^{th} \text{ doc tagged } K^{th} \text{ topic} \end{cases} \quad \text{Equation 1}$$

Also, let $\alpha = (\alpha_1, \alpha_2)$, where $\alpha_1$ is a parameter of a Dirichlet distribution of dimension $K_1$ and $\alpha_2$ is a parameter of a Dirichlet distribution of dimension $K_2$. For the $m^{th}$ word in the $n^{th}$ document, sample a topic: $Z_{nm} \cdot$multinomial $(\theta_n')$ where:

$$\theta_n' = (1-\varepsilon)\{\theta_{nK}\}_{K=1}^{K_1} + \varepsilon\{\Lambda_{n,kk}\theta_{nK}\}_{K=1+K_1}^{K} \quad \text{Equation 2}$$

Figure 5:
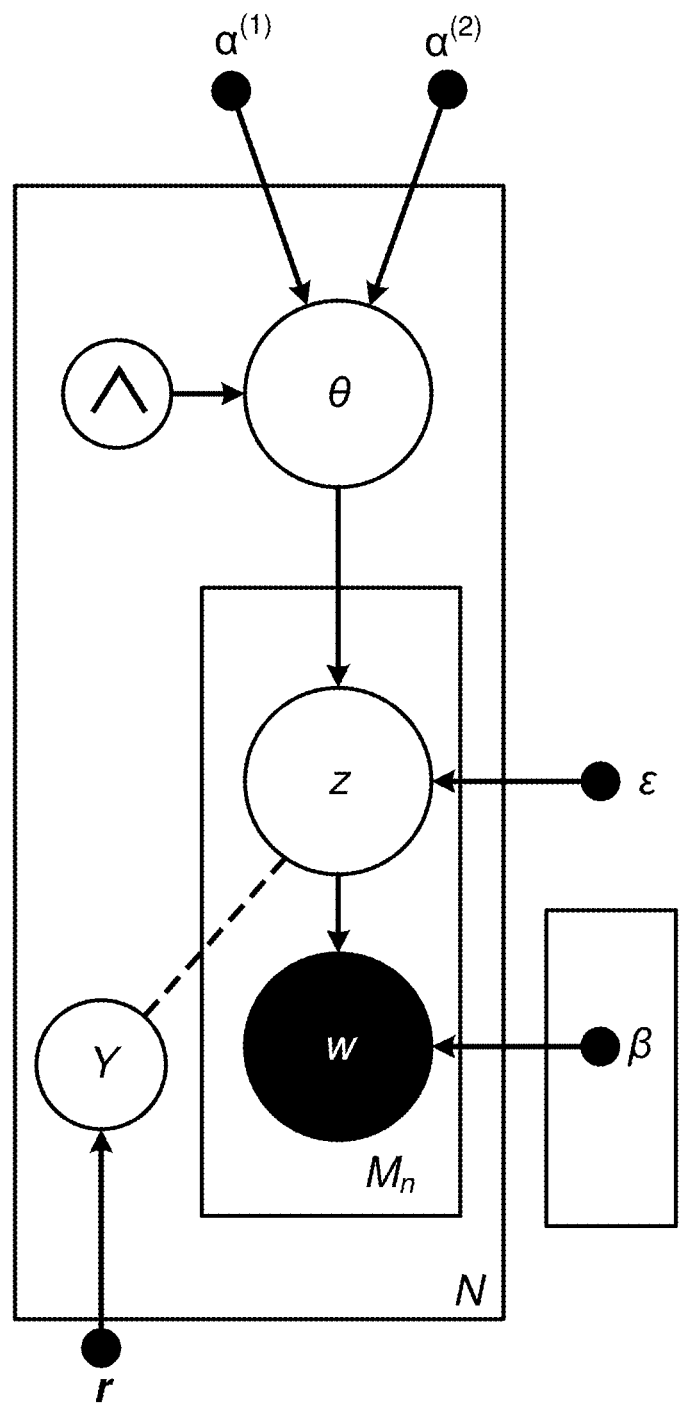
FIG. 5 is a logical diagram of a learning model incorporating both labeled LDA and discriminative LDA techniques, in accordance with at least the modeled embodiment described herein.

In Equation 2, with reference to FIG. 5, $\varepsilon$ is a term to weight latent vs. supervised topics. Now sample word $W_{mn} \sim$multinomial $(\beta_{z_{k,m}})$ where $\beta_k$ is a multinomial distribution over a vocabulary of words corresponding to the $K^{th}$ topic. For the $n^{th}$ document, generate:

$$y_n = \sum_{m=1}^{m_n} \frac{Z_{nm}}{M_n}$$

arg max$_y$ $\gamma_y^T \text{E}(\overline{Z_n})$ where $y_n$ in a class label associated with the $n^{th}$ document and where $Z_{nm}$ is an indicator vector of dimension K and $\gamma_y$ is a K-dimensional real vector corresponding to the y$^{th}$ class. $M_n$ is the number of words in the n$^{th}$ document. $\gamma_y$ is computed using the max-margin principle.

Referring still to the generative model, with respect to inference and learning, let one or more hidden variables Z, and one or more observed variables X be given as follows:

$$Z = \{\{z_{nm}\}, \{\theta_n\}\}$$ Equation 3A $$X = \{w_{nm}\}$$ Equation 3B

For a model parameter $k_0$, a joint distribution of the hidden and observed variables N may be expressed:

$$p(X, Z \mid K_0) = \prod_{n=1}^{N} p(\theta_n \mid \alpha_n) \cdot \prod_{m=1}^{M_n} p(Z_{nm} \mid \theta'_n) \cdot p(w_{n,m} \mid \beta_{z_{n,m}})$$ Equation 4A To avoid computational intractability, a factorized approximation may be used, which is given by:

$$q(Z \mid \{K_n\}_{n=1}^{N}) = \prod_{n=1}^{N} q(\theta_n \mid \gamma_n) \cdot \prod_{m=1}^{M} q(Z_{nm} \mid \phi_{nm})$$ Equation 4B Where:

$$\theta_n \sim Dir(\gamma_n) \forall n = \{1, \ldots, N\}$$ Equation 4C $$Z_{nm} \sim \text{multinomial}(\phi_{nm}) \forall n = \{1, \ldots N\} \text{ and } m = \{1, \ldots, N\}$$ Equation 4D $$K_n = \{\gamma_n, \{\phi_{nm}\}\}$$ Equation 4E Additionally:

$$\gamma_n = (\gamma_{nk})_{k=1}^{k} \forall n$$ Equation 5

$$\phi_{nm} = (\phi_{nmk})_{k=1}^{k} \forall n, m$$ Equation 6

Thus, the modified supervised LDA model for various embodiments reduces to the optimization problem:

$$\min(q, K_0, \{\varepsilon_n\}) \cdot \frac{1}{2}\|r\|^2 - L(q(Z)) + C \sum_{n=1}^{N} \varepsilon_n$$ Equation 7

Such that:

$$\forall n, y \neq y_n : E[\gamma^T \cdot \Delta f_n(y)] \geq 1 - \varepsilon_n; \varepsilon_n \geq 0$$ Equation 8

In the model presented herein, the slack variables are denoted as follows:

$$\begin{bmatrix} \Delta f_n(y)_N = f(y_n, \bar{z_n}) - f(y, \bar{z_n}) \\ \{\varepsilon_n\}_{n=1} \end{bmatrix}$$ Equation 9

The modified supervised LDA model projects the documents onto a combined topic space and uses a max-margin principle to predict class labels:

$$f(y, \bar{z_n}) = \begin{cases} \text{components of } \bar{z_n} \text{ from} & \\ (y-1)k + 1 & \text{to } yk \\ 0 & \text{else} \end{cases}$$ Equation 10

Expectation Step (E-Step):

$$\phi^*_{nmk} \propto \bigwedge_{n,kk}$$

$$\exp\left[\Psi(Y_{n_k}) + \log(\beta_k w_{nm}) + \log(e') + \frac{1}{M_n} \sum_{y \neq y_n} M_n(y) E[\gamma y_n k - \gamma_{yk}]\right]$$

$$\forall n, m, k.$$

Thus:

$$\gamma^*_{nk} = \bigwedge_{n,kk} \left[\alpha_k + \sum_{m=1}^{M_n} \phi_{nmk}\right], \forall n.m, k$$ Equation 11

$$B^*_{kv} \propto \sum_{n=1}^{N} \sum_{m=1}^{M_n} \phi_{nmk} \cdot I(w_{nm} = v) \forall n, k, v$$ Equation 12

$$L\left(\begin{matrix}\alpha_1\\\alpha_2\end{matrix}\right) = \left[\sum_{n=1}^{N} \log\left(r\left(\sum_{k=1}^{k} \alpha_{nk}\right)\right) - \sum_{n=1}^{N} \sum_{k=1}^{K} \log(r(\alpha_{nk}))\right] +$$

$$\sum_{n=1}^{N} \sum_{k=1}^{K} \left[\Psi(\gamma_{nk}) - \Psi\left(\sum_{k=1}^{k} \gamma_{nk}\right)\right](\alpha_{nk})$$ Equation 13

Maximization step (M-Step): Maximize objective function with respect to $k_0$, and update values for $\alpha_1$, $\alpha_2$ using support vector machine solver. Optimize the objective function with respect to $\gamma$. Thus $\gamma$ can be optimized, and therefore, the inventors have concluded that the framework can be reduced to an optimization problem, making it possible to make predictions not only across tasks, but also across domains.

Figure 9:
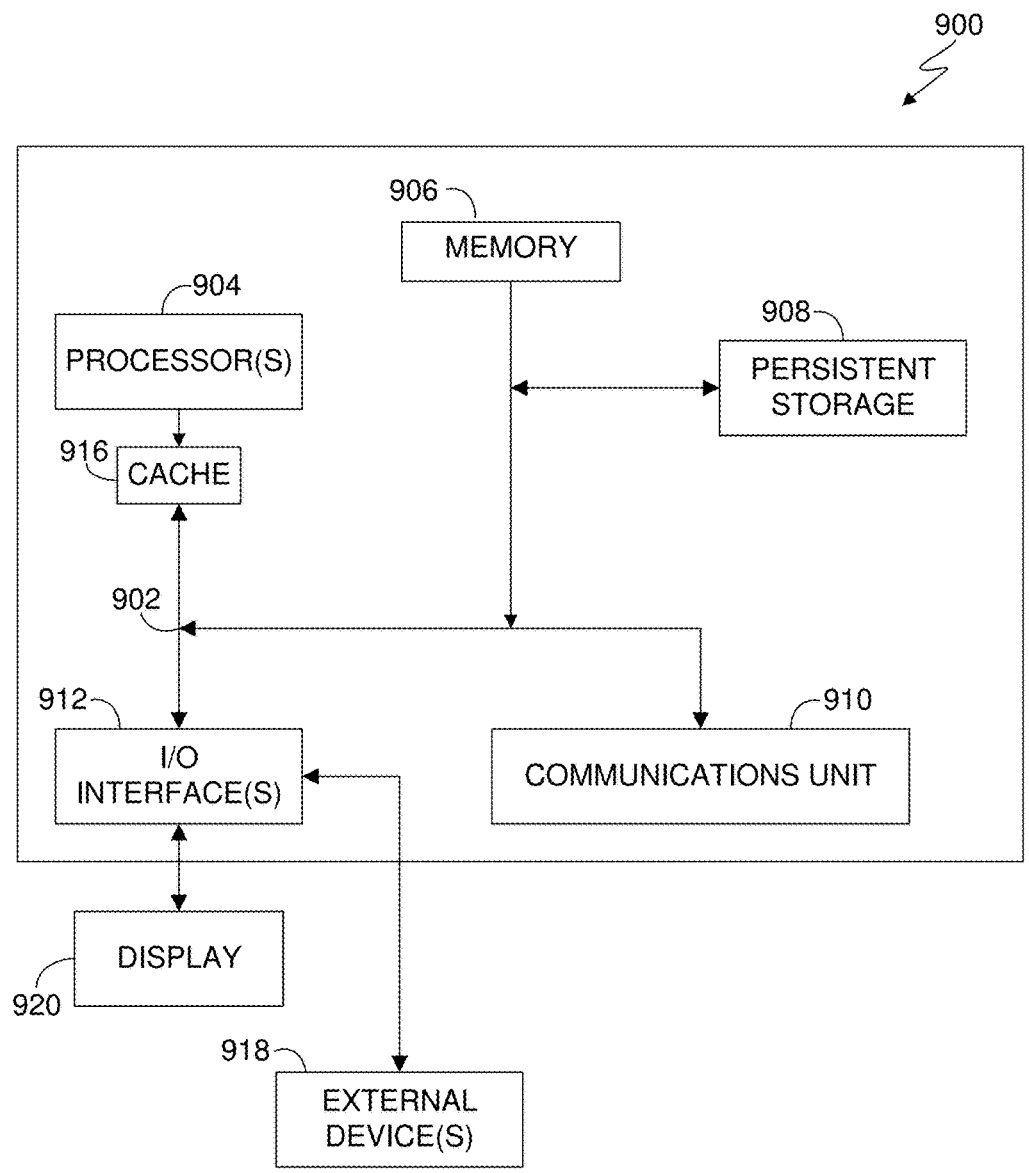
FIG. 9 is a block diagram depicting various logical elements for a computer system capable of executing program instructions, in accordance with at least one embodiment of the present invention.

FIG. 9 is a block diagram depicting components of a computer 900 suitable for executing the classifier generation program 101. FIG. 9 displays the computer 900, the one or more processor(s) 904 (including one or more computer processors), the communications fabric 902, the memory 906, the RAM, the cache 916, the persistent storage 908, the communications unit 910, the I/O interfaces 912, the display 920, and the external devices 918. It should be appreciated that FIG. 9 provides only an illustration of one embodiment and does not imply any limitations with regard to the environments in which different embodiments may be implemented. Many modifications to the depicted environment may be made.

As depicted, the computer 900 operates over a communications fabric 902, which provides communications between the cache 916, the computer processor(s) 904, the memory 906, the persistent storage 908, the communications unit 910, and the input/output (I/O) interface(s) 912. The communications fabric 902 may be implemented with any architecture suitable for passing data and/or control information between the processors 904 (e.g., microprocessors, communications processors, and network processors, etc.), the memory 906, the external devices 918, and any other hardware components within a system. For example, the communications fabric 902 may be implemented with one or more buses or a crossbar switch.

The memory 906 and persistent storage 908 are computer readable storage media. In the depicted embodiment, the memory 906 includes a random access memory (RAM). In general, the memory 906 may include any suitable volatile or non-volatile implementations of one or more computer readable storage media. The cache 916 is a fast memory that enhances the performance of computer processor(s) 904 by holding recently accessed data, and data near accessed data, from memory 906.

Program instructions for the classifier generation program 101 may be stored in the persistent storage 908 or in memory 906, or more generally, any computer readable storage media, for execution by one or more of the respective computer processors 904 via the cache 916. The persistent storage 908 may include a magnetic hard disk drive. Alternatively, or in addition to a magnetic hard disk drive, the persistent storage 908 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of the persistent storage 908.

The communications unit 910, in these examples, provides for communications with other data processing systems or devices. In these examples, the communications unit 910 may include one or more network interface cards. The communications unit 910 may provide communications through the use of either or both physical and wireless communications links. Classifier generation program 101 may be downloaded to the persistent storage 908 through the communications unit 910. In the context of some embodiments of the present invention, the source of the various input data may be physically remote to the computer 900 such that the input data may be received and the output similarly transmitted via the communications unit 910.

The I/O interface(s) 912 allows for input and output of data with other devices that may operate in conjunction with the computer 900. For example, the I/O interface 912 may provide a connection to the external devices 918, which may include a keyboard, keypad, a touch screen, and/or some other suitable input devices. External devices 918 may also include portable computer readable storage media, for example, thumb drives, portable optical or magnetic disks, and memory cards. Software and data used to practice embodiments of the present invention may be stored on such portable computer readable storage media and may be loaded onto the persistent storage 908 via the I/O interface(s) 912. The I/O interface(s) 912 may similarly connect to a display 920. The display 920 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    identifying a cognitive service suite, said cognitive service suite comprising a plurality of cognitive services;
    creating a classifier by:
        training a machine learning model using two or more tasks, wherein:
            said two or more tasks lie in two or more domains;
            said machine learning model comprises a combination of both labeled latent Dirichlet allocation and discriminative latent Dirichlet allocation; and
            said labeled latent Dirichlet allocation comprises a diagonal binary matrix of a dimension equal to total number of topics by total number of topics;
        including in said machine learning model at least one attribute common to at least two of said two or more domains, wherein said attribute is a shared characteristic;
        including in said machine learning model at least one latent feature that affects at least two of said two or more tasks that fall within one of said at least two domains, wherein said latent feature differentiates a topic within said one of said at least two domains; and
        constructing said classifier based on said machine learning model; and
    incorporating said classifier into at least two of said plurality of cognitive services, wherein a first cognitive service of said plurality of cognitive services comprises facial expression analysis to infer emotional state in conjunction with communicating on a first topic.

2. The computer-implemented method of claim 1, wherein said at least two of said plurality of cognitive services comprise distinct operational tasks within a single operational domain.

3. The computer-implemented method of claim 1, wherein said at least two of said plurality of cognitive services comprise a common operational task within distinct operational domains.

4. The computer-implemented method of claim 1, wherein said at least two of said plurality of cognitive services comprise distinct operational tasks within distinct operational domains.

5. The computer-implemented method of claim 1, wherein said plurality of cognitive services further comprises at least one service selected from the group consisting of: sentiment analysis; tone analysis; personality insight generation; conversational dialog; and customer engagement analysis.

6. The computer-implemented method of claim 1, wherein said cognitive service suite is accessible through at least one application programming interface.

7. The computer-implemented method of claim 6 wherein said at least one application programming interface is integrated with a cloud-based application development platform.

8. The computer-implemented method of claim 1, wherein said machine learning model further comprises weighting latent topics versus supervised topics.

9. The computer-implemented method of claim 1, wherein said labeled latent Dirichlet allocation further comprises:
    generating a weight of a particular topic in a document by multiplying (i) a parameter of Dirichlet distribution of a dimension equal to the total number of topics multiplied by (ii) the diagonal binary matrix.

10. A computer program product comprising one or more computer readable storage media and program instructions stored on said one or more computer readable storage media, said program instructions comprising instructions to:
    identify a cognitive service suite, said cognitive service suite comprising a plurality of cognitive services;

create a classifier by:
    training a machine learning model using two or more tasks, wherein:
        said two or more tasks lie in two or more domains;
        said machine learning model comprises a combination of both labeled latent Dirichlet allocation and discriminative latent Dirichlet allocation; and
        said labeled latent Dirichlet allocation comprises a diagonal binary matrix of a dimension equal to total number of topics by total number of topics;
    including in said machine learning model at least one attribute common to at least two of said two or more domains, wherein said attribute is a shared characteristic;
    including in said machine learning model at least one latent feature that affects at least two of said two or more tasks that fall within one of said at least two domains, wherein said latent feature differentiates a topic within said one of said at least two domains; and
    constructing said classifier based on said machine learning model; and
incorporate said classifier into at least two of said plurality of cognitive services, wherein a first cognitive service of said plurality of cognitive services comprises facial expression analysis to infer emotional state in conjunction with communicating on a first topic.

11. The computer program product of claim 10, wherein said at least two of said plurality of cognitive services comprise distinct operational tasks within a single operational domain.

12. The computer program product of claim 10, wherein said at least two of said plurality of cognitive services comprise a common operational task within distinct operational domains.

13. The computer program product of claim 10, wherein said at least two of said plurality of cognitive services comprise distinct operational tasks within distinct operational domains.

14. The computer program product of claim 10, wherein said plurality of cognitive services further comprises at least one service selected from the group consisting of: sentiment analysis; tone analysis; personality insight generation; conversational dialog; and customer engagement analysis.

15. A computer system comprising:
one or more processors;
one or more computer readable storage media;
computer program instructions;
said computer program instructions being stored on said one or more computer readable storage media;
said computer program instructions comprising instructions to:
    identify a cognitive service suite, said cognitive service suite comprising a plurality of cognitive services;
    create a classifier by:
        training a machine learning model using two or more tasks, wherein:
            said two or more tasks lie in two or more domains;
            said machine learning model comprises a combination of both labeled latent Dirichlet allocation and discriminative latent Dirichlet allocation; and
            said labeled latent Dirichlet allocation comprises a diagonal binary matrix of a dimension equal to total number of topics by total number of topics;
        including in said machine learning model at least one attribute common to at least two of said two or more domains, wherein said attribute is a shared characteristic;
        including in said machine learning model at least one latent feature that affects at least two of said two or more tasks that fall within one of said at least two domains, wherein said latent feature differentiates a topic within said one of said at least two domains; and
        constructing said classifier based on said machine learning model; and
    incorporate said classifier into at least two of said plurality of cognitive services, wherein a first cognitive service of said plurality of cognitive services comprises facial expression analysis to infer emotional state in conjunction with communicating on a first topic.

16. The computer system of claim 15, wherein said at least two of said plurality of cognitive services comprise distinct operational tasks within a single operational domain.

17. The computer system of claim 15, wherein said at least two of said plurality of cognitive services comprise a common operational task within distinct operational domains.

18. The computer system of claim 15, wherein said at least two of said plurality of cognitive services comprise distinct operational tasks within distinct operational domains.

19. The computer system of claim 15, wherein said plurality of cognitive services further comprises at least one service selected from the group consisting of: sentiment analysis; tone analysis; personality insight generation; conversational dialog; and customer engagement analysis.

20. The computer system of claim 15, wherein said cognitive service suite is accessible through at least one application programming interface.

* * * * *